Oct. 16, 1934.  J. GUTHRIE  1,976,990
CONDUIT TRACTOR
Filed March 24, 1932  3 Sheets-Sheet 1
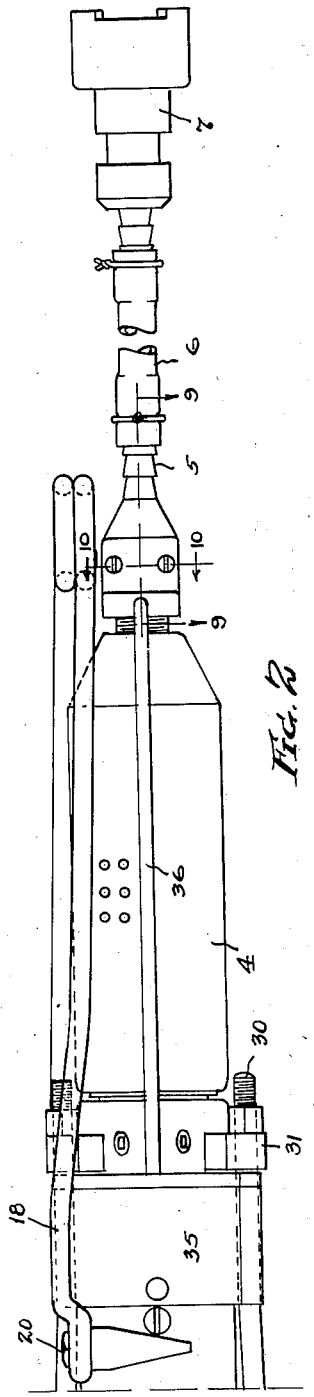
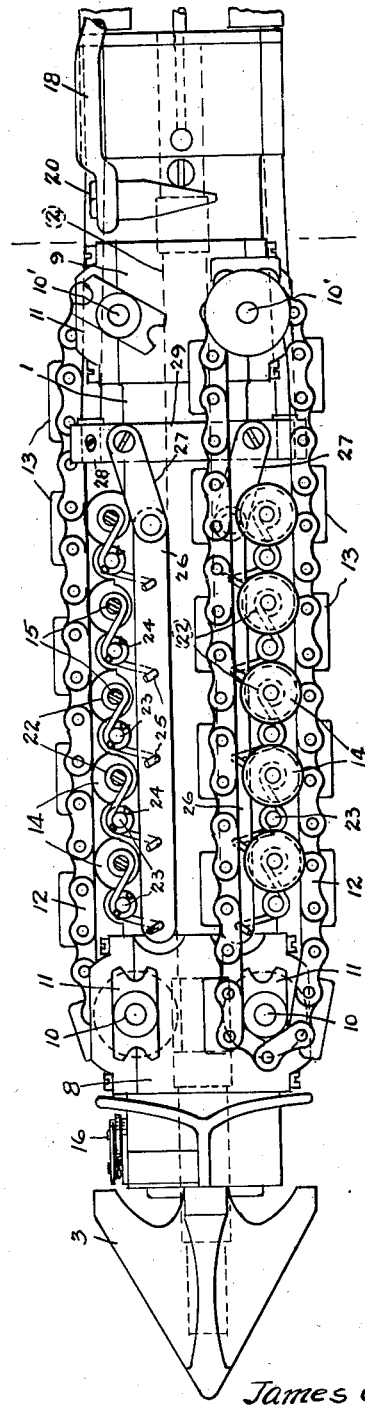
INVENTOR.
James Guthrie
BY
Fay, Oberlin & Fay
ATTORNEYS.

Oct. 16, 1934.  J. GUTHRIE  1,976,990
CONDUIT TRACTOR
Filed March 24, 1932  3 Sheets-Sheet 2
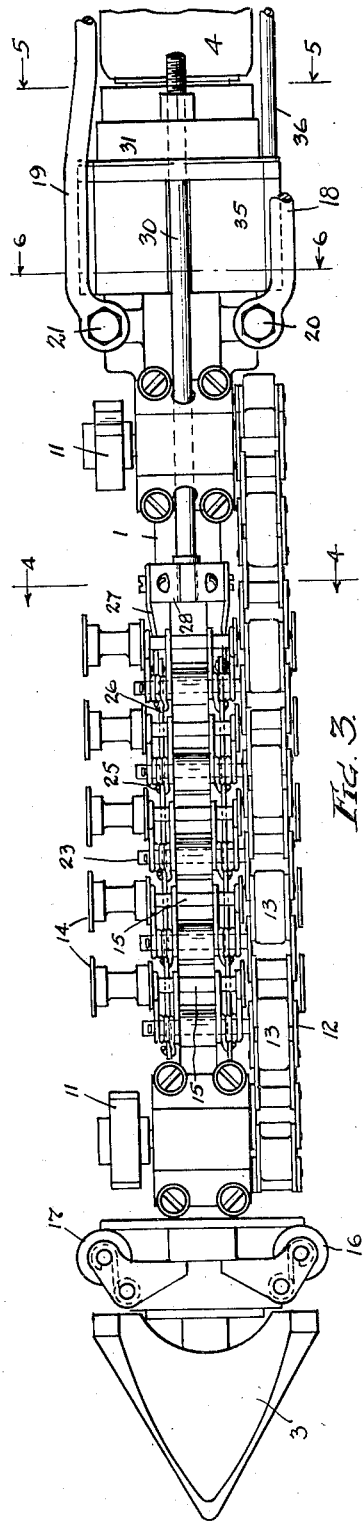
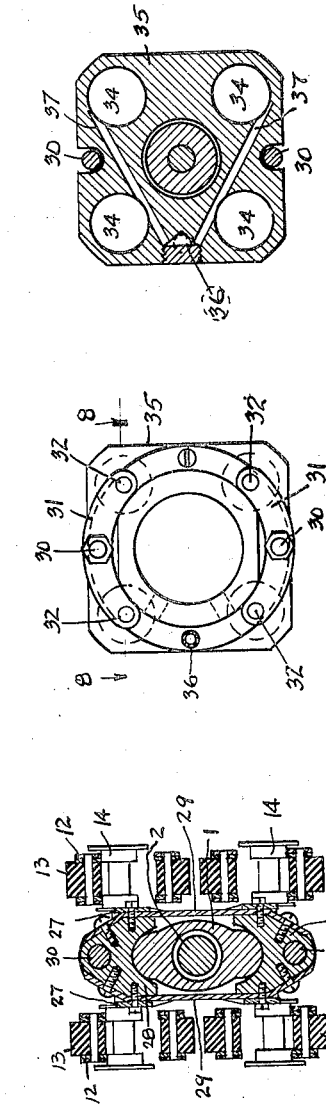

Oct. 16, 1934.  J. GUTHRIE  1,976,990
CONDUIT TRACTOR
Filed March 24, 1932  3 Sheets-Sheet 3

INVENTOR.
James Guthrie
BY
Fay, Oberlin & Fay
ATTORNEYS.

Patented Oct. 16, 1934

1,976,990

UNITED STATES PATENT OFFICE 1,976,990

CONDUIT TRACTOR

James Guthrie, Elyria, Ohio

Application March 24, 1932, Serial No. 600,947

12 Claims. (Cl. 175—377)

The present invention relates to a self-propelled vehicle adapted to travel through the interior of conduits, ducts, and tubes which are intended to serve as protective housings for electric cables and the like. The device embodying the subject matter of the present invention is adapted to be used for cleaning the interior of such conduits and for drawing cables and wires therethrough.

The general object and nature of my invention is to provide a self-propelled endless type of tractor which shall have firm positive tractional engagement with the sides of the conduit, by virtue of the provision of the power actuated means tending to force the intermediate run of the endless tracks in an outward direction. Another object is to provide means for automatically increasing the gripping pressure of the traction elements proportionately to resistance to the passage of the tractor. Objects and advantages additional to those above enumerated shall become apparent as the following description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 7:
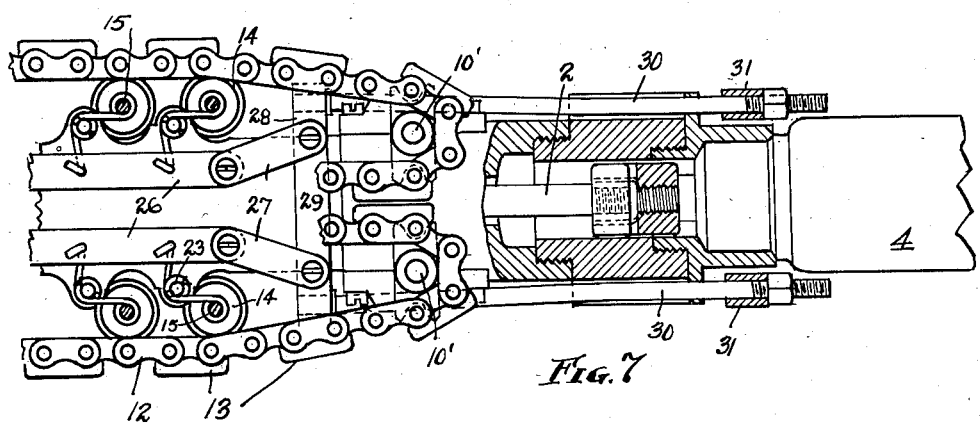
Figure 8:
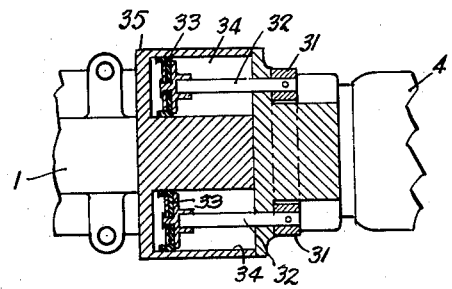
Figure 9:
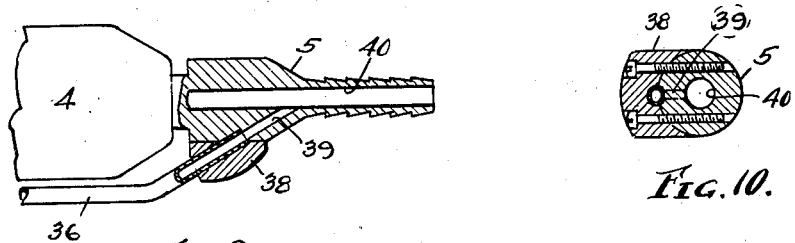
Figure 10:
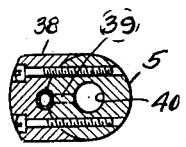

In said annexed drawings:

Fig. 1 is a view of the endless track portion of the device constructed according to the principle of my invention, with one track removed in order to more satisfactorily illustrate the detailed construction; Fig. 2 is a view of the driving motor or rear portion of my device; Fig. 3 is a view taken in a plane normal to that of Fig. 1; Fig. 4 is a section taken substantially upon line 4—4 of Fig. 3; Fig. 5 is a section taken substantially upon line 5—5 of Fig. 3; Fig. 6 is a section taken substantially upon line 6—6 of Fig. 3; Fig. 7 is a fragmentary view showing the endless track raising mechanism in full operating position; Fig. 8 is a section taken substantially upon line 8—8 of Fig. 5; Fig. 9 is a sectional view of the pneumatic power connecting joint and taken substantially upon line 9—9 of Fig. 2; Fig. 10 is a section taken substantially upon line 10—10 of Fig. 2.

Since underground cable conduits are generally constructed in a circular, square, or rectangular cross-sectional form, it is to be understood that the endless track engaging elements may be so disposed as to most suitably contact with the inner surface of such conduits. For example, in a tractor adapted for use with a conduit of circular cross section, the tractional engaging elements may be three in number and axially disposed upon the apexes of an equilateral or isosceles triangle. The device herein described, however, is adapted for use with a conduit having a square or rectangular cross section in which case the endless tracks are four in number and arranged in two parallel planes.

Now referring more particularly to the drawings, and as shown in Figs. 1 to 3 inclusive, my device consists of a longitudinal frame member indicated generally by the numeral 1 in which there is the centrally disposed rotatable shaft 2. The forward end of the shaft 2 mounts a drilling or reaming tool 3. The rearward end of the rotating central shaft 2 is connected to an air motor indicated generally by the numeral 4. The air motor 4 may be of any well known design and mechanically connected to the central shaft 2 through a series of reduction gears. The precise construction of the air motor and the reduction gear connection is not herein shown inasmuch as such mechanical constructions are well known in the art and hence need not be more specifically disclosed. An air pressure supply coupling 5 is connected to the flexible hose section 6 which is, in turn, connected to the metal hose coupling 7.

The forward and rear ends of the frame member 1 are composed of the enlarged portions 8 and 9 respectively which serve as means for supporting the endless track rotating shafts 10 and 10'. One or more of the shafts 10 are mechanically connected through a worm and spiral gear construction to the central driving shaft 2. The shafts 10' are movably mounted against a spring load in order to maintain tension in the endless chain 12. The precise details of this latter form of gearing and shaft mounting construction are fully disclosed and described in my co-pending application Serial No. 573,509, filed November 6, 1931. The transverse shafts 10 carry the sprockets 11 which in turn serve as means for rotatably supporting the endless chains 12. The endless chains 12 carry a plurality of projecting rubber pads or feet 13. The intermediate run of the endless chains 12 is supported by a number of flanged pulleys 14 mounted upon the movable shafts 15.

A pair of guide wheels 16 and 17 are mounted upon the forward end of the frame 1. These guide wheels 16 and 17 are supported upon spring loaded pivoted arms which tend to urge them in an outward direction and serve as a means tending to maintain the forward end or nose of the tractor in a centrally disposed location while traveling through the conduit.

A pair of cable connecting link arms 18 and 19 are secured to the rear end of the frame 1 by means of suitable fastening bolts 20 and 21 respectively.

It will thus be seen that rotation of the central shaft 2 by virtue of the power supplied to the pneumatic motor 4 will cause rotation of the forwardly disposed drill or reaming tool 3 and simultaneously cause the endless tracks 12 which are in engagement with the side walls of the conduit, to rotate about the end supporting shafts 10, whereby the entire tractor unit will be given a forward motion. An electric cable or cleaning tool may be connected to the rods 18 or 19 and thereby forcibly drawn through the interior of the conduit.

In order to force the intermediate run of the endless tracks 12 into positive resilient engagement with the inner wall surfaces of the conduit, I have provided the following described mechanism. The transverse shafts 15 which carry the flanged supporting pulleys 14 are mounted upon the ends of the movable supporting elements 22. The supporting elements 22 are preferably composed of fairly stiff spring wire stock and are coiled about the fixed shafts 23 mounted upon the frame 1. Cotter pins 24 may be provided in order to prevent axial displacement of the coiled portion of the elements 22 upon the fixed shafts 23. The opposite ends of the elements 22 are attached to the longitudinally extending link arms 26. The link arms 26 are, in turn, connected by the connecting arms 27 to the cross heads 28. The cross heads 28, in the present form of construction, are diametrically disposed on each side of the frame 1, and in turn secured together by the plates 29. A pair of connecting rods 30 lead from the cross heads 28 to the piston rod cross heads 31, which in turn are secured to the piston rods 32. The piston rods 32 carry the pistons 33 movably positioned in the pneumatic cylinders 34. The cylinders 34 which, in the present form of construction, are four in number are mounted in the cylinder block 35 which is positioned to the rear of and immediately adjacent the end of the frame member 1, as shown in Fig. 8.

Pneumatic power is supplied to the cylinders 34 through the connecting pipe 36 which, as shown in Fig. 6, communicates with the smaller interior passages 37 leading to the head ends of the cylinders 34.

Now referring to Figs. 9 and 10, it will be seen that the other end of the air tube 36 is attached to the main supply connection 5 by means of a removable casting 38 secured to one side thereof by means of suitable fastening bolts. The end of the air tube 36 is thus held in connecting position with the inner passage 39 communicating with the main pressure supply duct 40 in the connection 5. It will thus be seen by reference to Fig. 7, that exertion of pressure through the tube 36 and thence to the cylinders 34 will tend to force the connecting rods 30 to a rearward position. This latter action in turn is communicated to the link arms 26, likewise forcibly urging them to a rearward position. Inasmuch as the transverse shaft supporting elements 22 are connected to the link arms 26, they will be rotated about their fixed points of support, namely, the shafts 23, with the result that the movable transverse shafts 15 and pulleys 14 will be forced in an outward direction. Therefore, introduction of pressure to the cylinders 34 will function to forcibly urge the intermediate run of the endless tracks 12 in an outward direction against the inner walls of the conduit. It should be further noted that, inasmuch as the tube 36 is connected directly to the main power supply line, when the tractor is slowed up by reason of encountering some resisting obstruction in the conduit, there will occur a building up of back pressure in the main supply tube 40 with the result that a greater pressure will be exerted in the cylinders 34, which latter result tends to urge the intermediate track supporting elements into more forcible engagement with the conduit walls. Furthermore, this latter described action is automatic in operation, that is whenever the tractor in its forward motion comes in contact with some obstruction or resistance to its travel, it will be accordingly slowed down and the gripping or traction pressure will be accordingly increased. In a specimen device constructed according to the above described specifications, it has been found that a pneumatic power supply pressure of one hundred pounds per square inch will result in imparting a dead pull of three hundred and seventy pounds to the tractor itself.

It should be further noted, that although I have described the present embodiment of my invention as adapted for use with a pneumatic power supply, nevertheless, an equivalent type of pressure supply, such as hydraulic pressure may equally well be used so long as the spirit of my invention is not violated. The use of pneumatic pressure, however, is particularly to be desired inasmuch as the exhaust air functions to dilute and remove any contaminating or explosive gases found to be present in an underground conduit, thereby eliminating the hazards of explosion and gas poisoning of workmen.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a self-propelled tractor for the interior of conduits and the like, the combination of a frame, a plurality of endless tracks mounted longitudinally on said frame, and means actuated by the prime moving power supplied to said tractor for urging the intermediate run of said tracks in an outward direction from said frame.

2. In a self-propelled tractor for the interior of conduits and the like, the combination of a frame, a plurality of endless tracks mounted longitudinally on said frame, a plurality of transverse shafts movably mounted on said frame for supporting the intermediate run of said tracks, and means actuated by the prime moving power supplied to said tractor for urging said shafts in an outward direction from said frame.

3. In a self-propelled tractor for the interior of conduits and the like, the combination of a frame, a plurality of endless tracks mounted longitudinally on said frame, a plurality of transverse shafts movably mounted on said frame for supporting the intermediate run of said tracks, connecting arms pivotally mounted on said frame and having one end engaging with said shaft, a plurality of longitudinally disposed link bars having the other end of said connecting arms secured thereto, and power means for moving said bars in order to move said shafts in an outward direction from said frame.

4. In a self-propelled tractor for the interior of conduits and the like, the combination of a frame, a plurality of endless tracks mounted longitudinally on said frame, a plurality of transverse shafts movably mounted on said frame for supporting the intermediate run of said tracks, resilient connecting arms pivotally mounted on said frame and having one end engaging with said shaft, a plurality of longitudinally disposed link bars having the other ends of said connecting arms secured thereto, and power means for moving said bars in order to move said shafts in an outward direction from said frame.

5. In a self-propelled tractor for the interior of conduits and the like, the combination of a frame, a plurality of endless tracks mounted longitudinally on said frame, a fluid pressure motor for moving said tracks, a power supply conductor connected to said motor, power means for displacing said tracks in an outward direction from said frame, and a conduit connecting said power supply conductor to said track displacing means.

6. In a self-propelled tractor for the interior of conduits and the like, the combination of a frame, a plurality of endless tracks mounted longitudinally on said frame, a fluid pressure motor for moving said tracks, a pressure power supply conductor connected to said motor, a plurality of shafts movably mounted on said frame for supporting the intermediate run of said tracks, pressure cylinders carried by said frame, pistons movable in said cylinders, and means connecting said pistons to said movable shafts.

7. In a self-propelled tractor for the interior of conduits and the like, the combination of a frame, a plurality of endless tracks mounted longitudinally on said frame, a fluid pressure motor for moving said tracks, a pressure power supply conductor connected to said motor, a plurality of shafts movably mounted on said frame for supporting the intermediate run of said tracks, pressure cylinders carried by said frame, pistons movable in said cylinders, means connecting said pistons to said movable shafts, and a conduit connecting said cylinders to said power supply conductor.

8. In a self-propelled vehicle for the interior of conduits and the like, the combination of a frame, a plurality of endless tracks mounted longitudinally on said frame, a fluid pressure motor for moving said tracks, a pressure power supply conductor connected to said motor, a plurality of transverse shafts movably mounted on said frame for supporting the intermediate run of said tracks, connecting arms pivotally mounted on said frame and having one end engaging with said movable shafts, a plurality of longitudinally disposed link bars having the other ends of said connecting arms secured thereto, pressure cylinders positioned in said frame, pistons movable in said cylinders, connecting rods between said pistons to said link bars and a conduit connecting said cylinders to said power supply conductor.

9. In a self-propelled vehicle of the character described, the combination of a plurality of endless tracks, resilient supporting means carrying the intermediate run of said tracks, and means actuated by the prime moving power supplied to said vehicle for varying the degree of resiliency of said supporting means.

10. In a self-propelled vehicle of the character described, the combination of an endless track, resilient supporting means for urging the intermediate run of said track into tractional engagement with the surface to be traversed, and means actuated by the prime moving power supplied to said vehicle for varying the degree of resiliency of said supporting means.

11. In a self-propelled vehicle of the character described, the combination of a frame, a plurality of endless tracks mounted upon said frame, resilient supporting means for urging the intermediate run of said tracks outwardly from said frame, and means actuated by the prime moving power supplied to said vehicle for varying the degree of resiliency of said supporting means.

12. In a self-propelled vehicle of the character described, the combination of an endless track, and power means for urging the intermediate run of said track into tractional engagement with the surface to be traversed, the force exerted by said power means being directly proportional to the force necessary to actuate said track.

JAMES GUTHRIE.